June 22, 1965  A. W. HUGHES  3,189,940
DEAERATING MACHINE FOR SAUSAGE BATTER OR THE LIKE
Filed Sept. 18, 1963  3 Sheets-Sheet 2
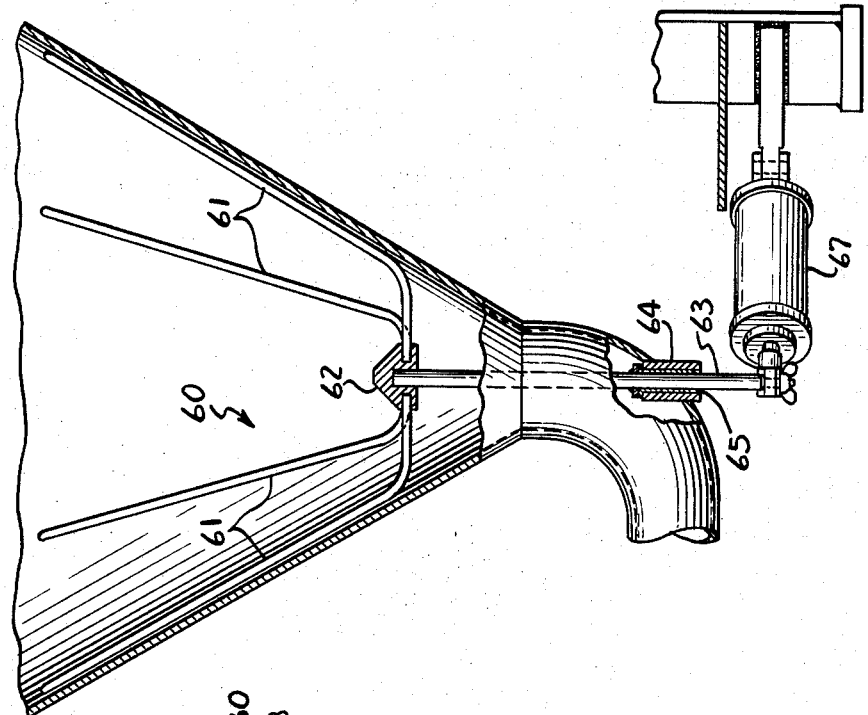
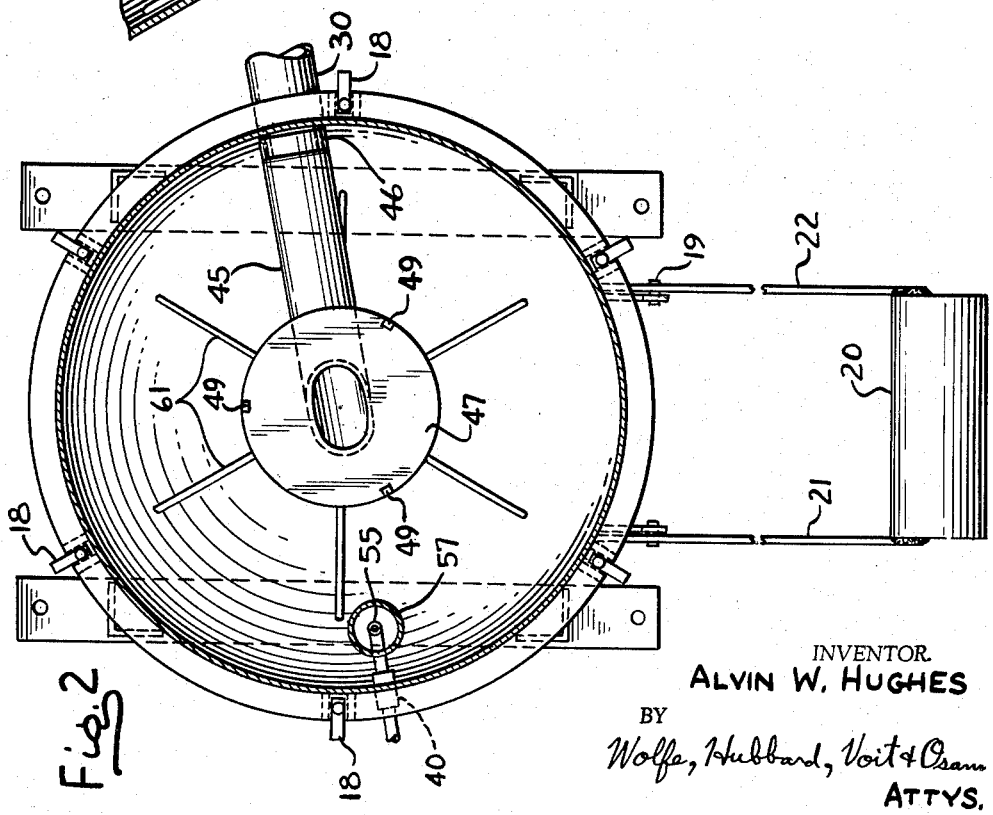
INVENTOR.
ALVIN W. HUGHES
BY
Wolfe, Hubbard, Voit & Osann
ATTYS.

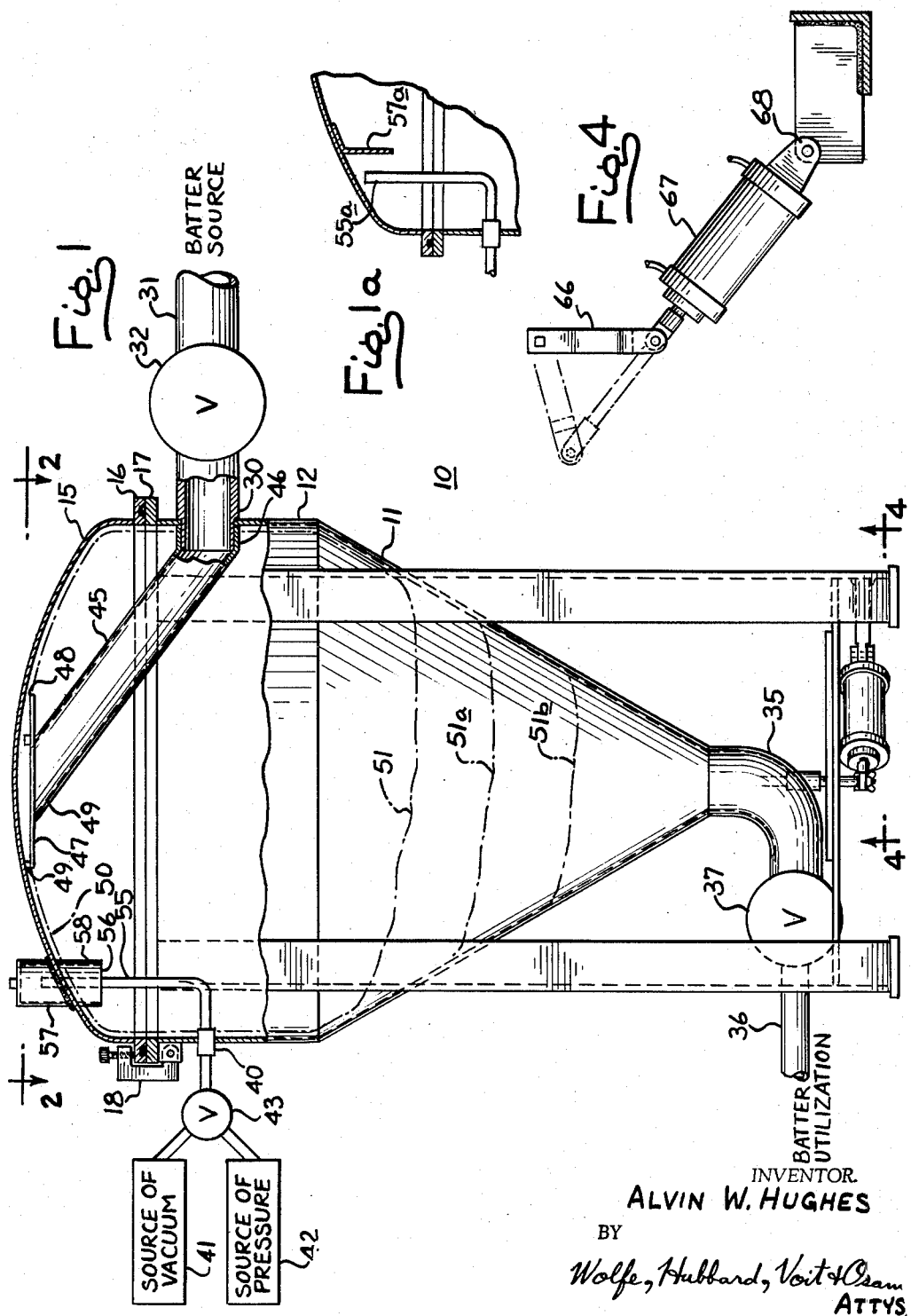

United States Patent Office 3,189,940
Patented June 22, 1965

3,189,940
DEAERATING MACHINE FOR SAUSAGE BATTER
OR THE LIKE
Alvin W. Hughes, 4 N. 194 Church Road, Bensenville, Ill.
Filed Sept. 18, 1963, Ser. No. 309,629
6 Claims. (Cl. 17—39)

The present invention relates to machines for deaerating and transporting sausage batter or the like.

It is an object of the present invention to provide a deaerating and transporting machine for sausage batter and the like which is capable of removing entrained air more rapidly and more efficiently than prior devices intended for this purpose thereby to reduce the cost of deaeration for each pound of batter treated.

It is another object of the present invention to provide a deaerating machine which not only permits deaeration in a short time interval but which permits more rapid and more efficient discharge, permitting use of pressures which are lower than those formerly required, or, alternatively, enabling a shorter discharge time at the same pressure. It is a more specific object of the present invention to provide a deaerating machine for sausage batter or the like which may be easily and quickly assembled or disassembled with all of the parts exposed for cleaning and which precludes the possibility of batter entering the air line during the vacuum portion of the cycle. Also it is an object to provide a deaerating machine operating on a batch cycle but which provides efficient and substantially complete discharge of each batch, thereby reducing the likelihood that batter entering the machine as portion of an early batch will be kept in the machine through successive batches with danger of rise of bacterial count in the retained portion. Consequently it is an object to provide a deaerating machine which is more sanitary than machines of this type previously employed.

Other objects and advantages will become apparent upon reading the attached detailed description and upon reference to the drawings in which:

FIGURE 1 shows a deaerating and transporting machine constructed in accordance with the present invention and with a portion of the chamber wall being broken away in order to reveal the internal construction.

FIG. 1a is a fragment showing alternative use of a baffle to shield the nipple.

FIG. 2 is a plan view of the device shown in FIG. 1 with the cover broken away to show the profile of the batter spreading arrangement looking along line 2—2 in FIG. 1.

FIG. 3 is an enlarged fragmentary section of the lower portion of the deaerating chamber showing the spider employed for wiping the conical walls.

FIG. 4 is a bottom view looking along the line 4—4 in FIG. 1 showing the spider actuating mechanism.

Figure 5:
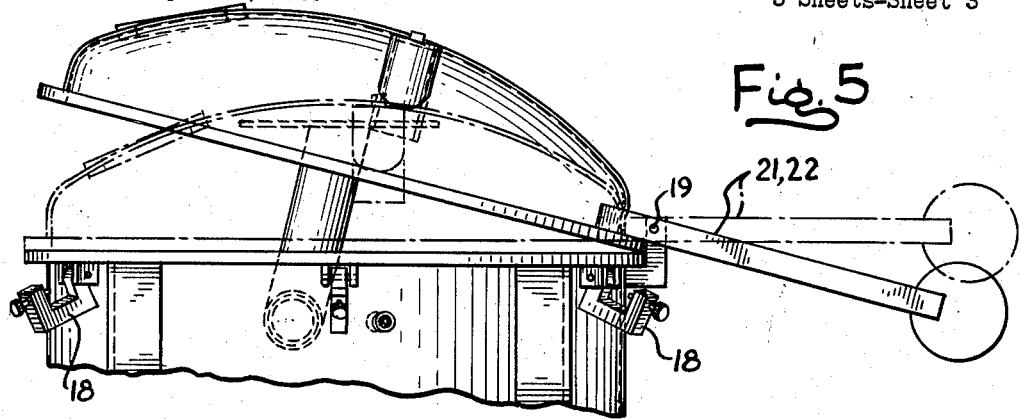
FIG. 5 is a fragmentary view of the upper portion of the deaerating chamber showing the cover in the act of swinging it to upraised position.

While the invention has been described in connection with a preferred embodiment, it will be understood that there is no intention to limit the invention to the embodiment shown but I intend to cover the various alternative and equivalent constructions falling within the spirit and scope of the appended claims.

Turning now to the drawings there is disclosed in FIGS. 1 and 2 a deaerating and transporting apparatus 10 having a body 11 in the shape of an inverted cone joined to a cylindrical section 12. For the purpose of enclosing the chamber thus formed, a cover 15 is used. The mating flanges 16, 17, secured to the body and cover respectively, may be sealed by a suitable gasket or O-ring and held together by means of a plurality of quick disconnect clamps 18. The top 15 is preferably hinged to the body by a hinge 19 (FIG. 5) and counterweighted by a counterweight 20 mounted at the ends of parallel arms 21 and 22 welded or otherwise secured to the top.

The body is supported in the present instance on a set of vertical legs 25 made of angle iron or the like and which may be four in number, equally spaced about the periphery.

For the purpose of admitting batter from a pressurized source, a batter inlet fitting 30 is provided in the wall of the structure which communicates with an inlet conduit 31 via an inlet valve 32. For the purpose of discharging the collected batter, the lower end of the conical housing terminates in an elbow 35 which communicates with a discharge conduit 36 via a discharge valve 37.

For the purpose of cyclically evacuating and pressurizing the deaerating chamber, an air fitting 40 is provided communicating with a source of vacuum 41 and source of pressure 42 via a selector valve 43. It will be understood that the term "source of vacuum" is simply used for the sake of convenience and such "source" may, for example, be a vacuum pump capable within a short space of time of drawing a vacuum within the chamber on the order of 26 inches of mercury. Analogously, the source of pressure 42 may be a compressor and suitable reservoir so that when the valve 43 is switched to its "pressure" state, wall pressure, which may be on the order of 14–25 lbs. p.s.i., may be promptly developed.

In accordance with the present invention, a spreader plate is provided at the terminus of the batter conduit at the upper end of the chamber for causing the incoming batter to be spread into a thin flowing layer, as contrasted with the usual solid stream, in which any entrained air is at a shallow depth for prompt deaeration of the batter prior to the batter's collecting at the bottom of the chamber. More specifically, a gooseneck is provided which is detachably secured to the inlet fitting 30 and which extends upwardly into the vicinity of the inner wall of the cover and which has at its upper end a spreader plate which is spaced parallel with the wall so that the incoming batter is fed into a thin layer which flows along the wall radially outward in all directions. Thus, turning to the drawings, the gooseneck, indicated at 45, has an inlet end 46 which is detachably secured to the fitting 30 by telescoping or the like and an upper end which terminates adjacent the inner wall of the cover. Secured to the upper end of the gooseneck is an annular spreader plate 47 having a central opening. For the purpose of insuring a peripheral discharge opening 48 of constant width, a plurality of spacers 49 are used which are preferably secured to the periphery of the plate 45 and which may, for example, be three in number. As seen in the drawings, the gooseneck, spreader plate and spacers are so dimensioned that the spacers firmly seat on the inside wall of the cover when the cover is fully seated. In order to promote radial flow along the internal surface of the cover, the cover is preferably made "dome" shaped as shown.

Thus, when the inlet valve 32 is opened and the discharge valve 37 is closed, and with vacuum applied within the chamber via the valve 43, the incoming batter from the pressurized source 33, and with the flow additionally induced by the vacuum, flows in the form of a relatively thin layer in all directions outwardly from the spreader plate 47 as indicated at 50 in FIG. 1, thereby insuring that all of the air which may be entrained in the incoming batter is at a shallow depth permitting easy extraction and further insuring that a maximum of batter area will be presented to the vacuum within the chamber. As a result of the expanding entrained air, it is contemplated that there will be a certain amount of surface disintegration of the flowing batter so that a certain amount of batter will tend to dislodge itself from the flowing stream and fall directly downward thereby still further increasing the amount of exposed area, and with the deaerated batter collecting, as indicated at 51, in the bottom of the chamber.

For the purpose of insuring that none of the batter will be drawn into the vacuum system during the evacuation portion of the cycle, means are provided for withdrawing air from the vessel at a point above the level of the flowing batter and for shielding the air conduit against the action of the batter stream. Thus, as shown in FIG. 1, there is provided, connected to the air fitting 40, an L-shaped nipple 55 which extends upwardly into a trap or recess 56 provided in the cover. Such recess is conveniently provided by a short length of larger diameter pipe 57 which preferably extends downwardly below the level of the cover to provide a depending skirt 58, thereby to shield the nipple 55 against the direct action of the flowing batter. It is found that this arrangement insures against entry of batter into the vacuum system even when the device is cycled at a high rate involving movement of relatively large amounts of air. Where it is desired to increase the volume of the air trap to further insure against unwanted entry of batter into the nipple, a vertical baffle 57a may be used as shown in FIG. 1a, which baffle may be in the form of a plate of metal extending cord-wise and welded in position in the cover 15. When this construction is used, the nipple 55a may be terminated short of the upper wall as shown.

In accordance with one of the aspects of the invention means are provided for insuring prompt and efficient discharge of the batter 51 collected at the bottom of the chamber. Thus, in addition to providing for pressure discharge, I provide a rotating spider or wiper which is nested within the conical wall and which is oscillated by means of a shaft which extends upwardly through the discharge elbow 35. Thus, referring to FIG. 3, there is provided a spider 60 having legs 61, which may be six in number, connected to a central hub 62 secured to a downwardly extending shaft 63. For the purpose of providing a rotary seal for the exiting of the shaft through the elbow, there is provided in the elbow a bushing 64 having a resilient sealing element in the form of a sleeve 65 of nylon or the like. To oscillate the spider, an arm 66 is provided which is connected to an air actuator 67, suitably anchored to the frame at a pivot point 68. The linkage may be adjusted so that the spider sweeps through an arc which is somewhat greater than the angular spacing between the legs 61, in the present instance an arc of about 70°. By wiping the sides of the chamber, any batter which might tend to cling to the side walls, in spite of the steep angle thereof, is dislodged so that the material tends to gravitate downwardly forming a constant "plug" of the batter upon which the contained air pressure may act at an efficient angle. Typical successive levels on discharge have been indicated at 51a, 51b. In short, the spider prevents any "coring" tendency which would tend to reduce the capacity of the machine and tend to slow up the discharge time, particularly where the machine is used through many hundreds of cycles over a work shift. Moreover, the constant dislodgement of the collected batter insures that the batter which is deposited in the machine is discharged promptly thereby reducing the likelihood that batter may accumulate along the walls and remain there until the machine is cleaned, in the regular course, some hours later or at the end of the work shift.

The spider 60 not only facilitates prompt and complete discharge during the pressure portion of the cycle but it also serves during the vacuum portion of the cycle to promote an orderly buildup of the collected batter in the form of a substantially level plug of material "from the bottom up" rather than allowing material to collect and "hang" from the sides. As a result a solid stream of batter is fed to the outlet conduit free of voids or large air bubbles.

Figure 6:
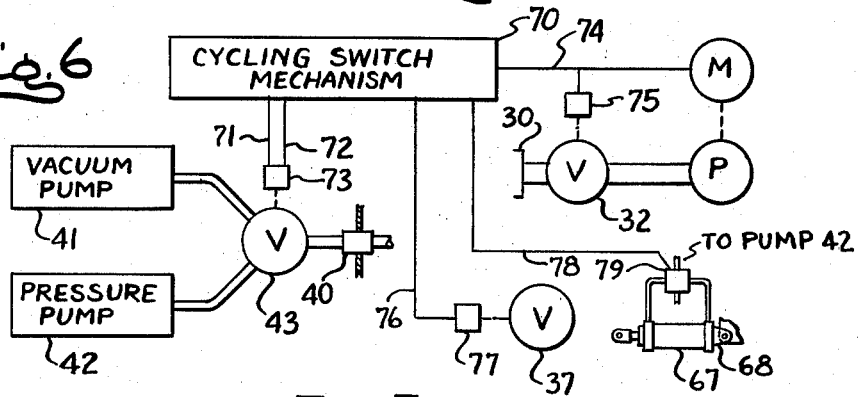
FIG. 6 is a block diagram showing the control system for use with the device of FIG. 1.
Figure 7:
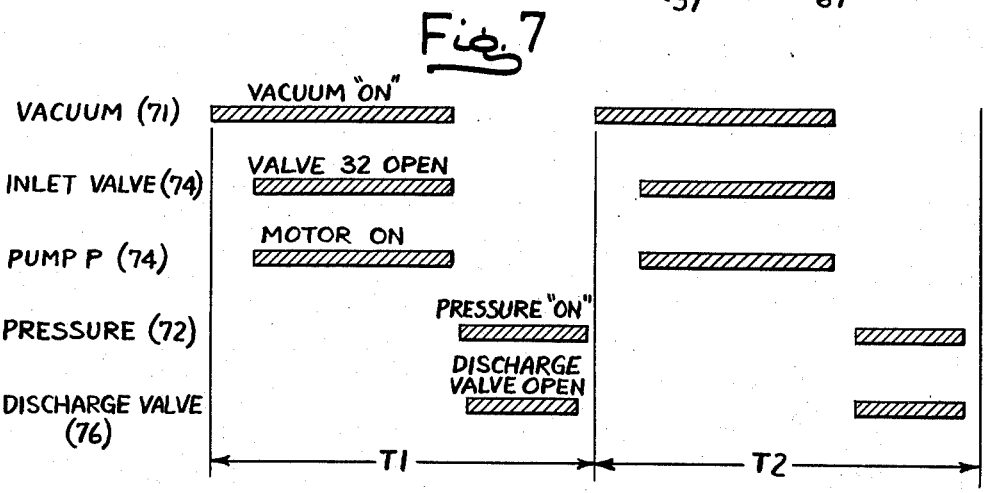
FIG. 7 is a sequence diagram showing the timing of the operations occurring during a typical vacuum-pressure cycle.

While the cyclical operation of the device will be apparent from the foregoing description, nevertheless it may be helpful to review it in connection with the control system diagrammatically set forth in FIGS. 6 and 7. For the purpose of controlling the inlet and discharge cycle, a cycling switch mechanism 70 is employed having control lines 71, 72 which energize a solenoid or the like 73 which operate the selector valve 43 for selectively applying vacuum and pressure. A further control line 74 operates solenoid 75 which controls the inlet valve 32. The same control line 74 may be used to turn on the motor M which drives a pump P supplying the batter at positive pressure to the inlet valve 32. A control line 76 operates a solenoid 77 to control the discharge valve 37. Finally, a control line 78, periodically energized, actuates a 4-way valve 79 for reciprocation of the spider cylinder 67.

The construction of the cycling switch 70 does not per se constitute part of the present invention and many different commercial brands of switches may be used to produce the desired cycling schedule. Such schedule has been set forth in FIG. 7 which indicates the "on" times and operating sequence of the various portions of the device in a typical period T1. The numbers in parentheses indicate the active control lines.

Thus at the very beginning of the cycle, with the inlet and discharge valves closed, vacuum is applied. Shortly thereafter, after a working vacuum exists in the chamber, the inlet valve 32 is opened and the motor M is turned on so that batter flows into the chamber and is acted upon by the spreader plate to form a thin moving layer 50 as previously described. The deaerated batter collects at the bottom of the chamber where the oscillated spider insures a progressive buildup of the well formed plug of deaerated batter 51. After expiration of a predetermined time interval, corresponding to the desired degree of "fill," the inlet valve and motor are turned off, the discharge valve is opened and the selector switch 43 switches from its vacuum to its pressure condition. The pressure in a practical case may be as low as 14 lbs. and depends in part upon the nature of the material and the opposition offered by the discharge conduit through which it has to flow to reach a subsequent processing device. If desired, the pressure may be set a bit "high" and a relief valve may be provided to cause venting when a predetermined pressure is reached. Moreover, it will be understood by one skilled in the art that an accumulator or reservoir may be employed to increase the effective capacity of either the pressure or vacuum pump. Upon completion of a first cycle T1 the cycling switch immediately begins a second cycle T2 identical to the first, and this process is repeated at closely spaced intervals. Since the device is actively working in one phase or another of the operating cycle, the effect is to produce a high rate of discharge of substantially deaerated batter. The device is capable of operating more or less indefinitely unattended and, if desired, several of the chambers may be employed in tandem, but with offset cycles, to produce substantially constant flow through the discharge conduit 36. It will be apparent that while automatic operation of the valves may be employed, as described, the valves, and particularly the discharge valve 37, may be manually operated without sacrifice of the basic features and advantages of the device.

When the time comes for cleaning, it is a simple matter to shut off the flow, vent the device and loosen the clamps 18, following which the cover may be swung open as shown in FIG. 5, its weight being counterbalanced by the counterweight 20. This frees the gooseneck 45 so that it may be withdrawn from the fitting 39. The wing nut or the like at the lower end of the shaft 63 may be unscrewed, enabling the spider to be drawn upwardly out of the chamber and permitting scrubbing and flushing of the conical wall.

While the present invention has particular application to the deaeration and transportation of sausage batter, it will be apparent that the invention is not necessarily limited thereto and is usable wherever it is desired to deaerate and transport a fluid or semi-fluid material.

I claim as my invention:

1. In a vacuum-pressure apparatus for transporting and deaerating batter or the like, the combination comprising an enclosed vacuum-pressure chamber, said chamber having a generally conical body portion and a removable cover, an inlet fitting in the body portion having an associated inlet valve for communicating with a source of batter under pressure, discharge means at the lower end of the chamber including a discharge valve, a source of vacuum, a source of air pressure, valve means for selectively coupling said sources to said chamber, means for operating said valve means to apply a vacuum in said chamber with said inlet valve open and said discharge valve closed, a gooseneck within said chamber connected to said inlet fitting and extending upwardly in said chamber terminating adjacent the inner surface of the cover, and means at the terminus of said gooseneck for causing the stream of batter which is drawn through the inlet conduit to spread over the surface of the cover in the form of a thin flowing layer in which any entrained air is at shallow depth for prompt deaeration of the batter prior to the batter's collecting at the bottom of the chamber, and means for operating said valve means to apply pressure in said chamber with said discharge valve open and said inlet valve open for fluid discharge of the collected batter.

2. In a vacuum-pressure apparatus for transporting and deaerating batter or the like, the combination comprising an enclosed vacuum-pressure chamber having a generally conical body portion and having a disengageable cover, an inlet fitting in the wall of said body portion, means including an inlet valve for connecting said fitting to a source of batter under pressure, discharge means at the lower end of said chamber and including a discharge valve, a source of vacuum, a source of air pressure, valve means for selectively coupling said sources to said chamber, means for operating said valve to apply a vacuum to said chamber with the inlet valve open and discharge valve closed, a gooseneck detachably secured to said inlet fitting at its lower end and extending upwardly within said chamber, a spreader plate secured to the upper end of said gooseneck and having a central opening therein, said spreader plate having associated spacers and said gooseneck being so dimensioned that when the cover is applied and seated on the body portion of the chamber pressure is applied against the spreader plate by said spacers thereby to maintain the gooseneck in place and to establish a predetermined thickness of batter flowing between said plate and said cover in which any entrained air is at shallow depth for prompt deaeration of the batter prior to the batter's collecting at the bottom of the chamber, and means for operating the valve means so that pressure is applied to the chamber with the discharge valve open and the inlet valve closed for fluid discharge of the collected batter.

3. In a vacuum-pressure apparatus for transporting and deaerating batter or the like, the combination comprising an enclosed vacuum-pressure chamber, said chamber having a generally conical body portion and a removable cover, an inlet fitting having an associated inlet valve for communicating with a source of batter under pressure, discharge means at the lower end of said chamber and including a discharge valve, a source of vacuum, a source of air pressure, valve means for selectively coupling said sources to said chamber, means for operating said valve means to apply a vacuum in said chamber with the inlet valve open and a discharge valve closed, a gooseneck within said chamber detachably secured to said inlet fitting and extending upwardly in said chamber terminating adjacent the inner surface of the cover, a spreading element at the terminus of said gooseneck for causing the stream of batter which is drawn through the inlet conduit to spread over the surface of the cover, an air fitting in the wall of the chamber, a nipple connected to said air fitting within said chamber, the nipple having a trap associated with the end thereof to insure against entry of batter into said nipple during the vacuum portion of the cycle, and means for operating said valve means so that air pressure is applied to said air fitting with the discharge valve open and the inlet valve closed for fluid discharge of the collected batter.

4. A vacuum-pressure apparatus as claimed in claim 3 wherein said trap is provided in the cover and said nipple extends upwardly into said trap for shielding the nipple against entry of batter during the vacuum portion of the cycle.

5. A vacuum-pressure apparatus according to claim 1 wherein said discharge means at the lower end of the chamber includes a rotating spider within said chamber having legs lying in a conical locus for cooperating with the conical wall of the chamber for establishing a well-defined plug of batter as the batter collects during the vacuum portion of the cycle and for urging the batter downwardly for prompt and complete discharge during the pressure portion of the cycle.

6. A vacuum-pressure apparatus according to claim 5 wherein said spider includes a vertical shaft extending downwardly through the chamber, and means at the lower end of the shaft for rotating the same to insure complete discharge of the collected batter during the pressure portion of the cycle.

References Cited by the Examiner
UNITED STATES PATENTS

| | | | |
|---|---|---|---|
| 2,690,589 | 10/54 | Moses | 17—39 |
| 2,889,574 | 6/59 | Thielen et al. | 17—39 X |
| 3,081,484 | 3/63 | Schnell | 17—35 |
| 3,108,319 | 10/63 | Thompson | 17—39 |

SAMUEL KOREN, *Primary Examiner.*
LUCIE H. LAUDENSLAGER, *Examiner.*